N. JONES.
Car-Axle.

No. 199,207.                    Patented Jan. 15, 1878.

Witnesses:
P. C. Dieterich
Frank W. Duffy.

Inventor:
Nathaniel Jones
per C. H. Watson & Co.
Attorneys.

UNITED STATES PATENT OFFICE.

NATHANIEL JONES, OF SYRACUSE, NEW YORK.

IMPROVEMENT IN CAR-AXLES.

Specification forming part of Letters Patent No. 199,207, dated January 15, 1878; application filed December 29, 1877.

*To all whom it may concern:*

Be it known that I, NATHANIEL JONES, of Syracuse, in the county of Onondaga and State of New York, have invented certain new and useful Improvements in Car-Axles; and I do hereby declare that the following is a full, clear, and exact description of my invention, which will enable others skilled in the art to which it appertains to make and use the same, reference being had to the accompanying drawings, and to the letters of reference marked thereon, which form a part of this specification.

The nature of my invention consists in the construction and arrangement of a divided axle, with wheels movable independent of each other, and capable of extension and contraction, while in either position they are locked to prevent spreading, and adapted for railroad and street-railroad cars and other purposes, as will be hereinafter more fully set forth.

Figure 1:
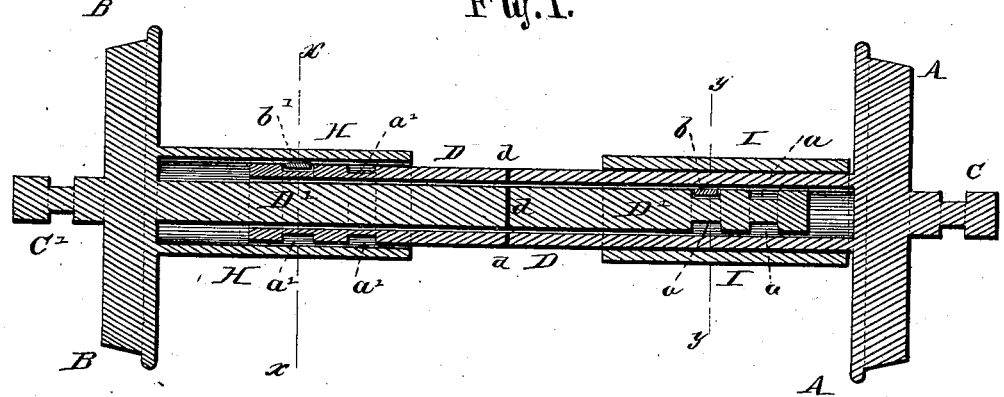
Figure 2:
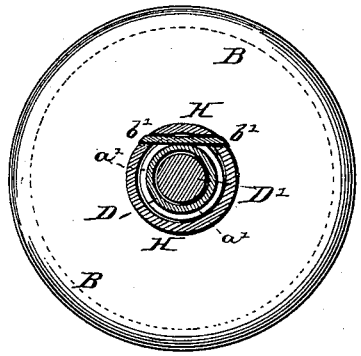
Figure 3:
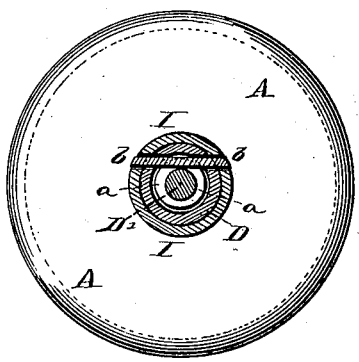

In the annexed drawings, which fully illustrate my invention, Figure 1 is a longitudinal section of my invention; and Figs. 2 and 3 are transverse sections on the lines $x\,x$ and $y\,y$, respectively, of Fig. 1.

A and B represent the two car-wheels of one pair or set, connected by a divided axle in the following manner: The wheel A is, on its outer side, formed or provided with the usual projecting journal C, to be placed and held in the car-axle journal-box, while from the inner side of said wheel extends the axle D, of such length as to reach to, or nearly to, the other wheel, B. This axle D is made hollow, or otherwise bored out, from its outer end inward for a suitable distance, and, preferably, the entire length up to the side of the wheel.

The wheel B is, on the outer side, provided with a journal, C', similar to the journal C of the wheel A, and from the inner side of said wheel B projects an axle, D', of such dimensions as to fit in the bored-out or hollow axle D. From the inner side of the wheel B also extends a sleeve or elongated collar, H, concentric with the axle D', and of such diameter as to fit over the end of the axle D.

In the outer end of the axle D' are made one or more recesses, $a\,a$, extending entirely around the axle, as shown; and one or more flat keys, $b$, are passed through slots in the hollow axle D, and fill one or more of the recesses $a$ on one side completely, preventing any lateral motion of either wheel or either part of the divided axle, while it allows the two parts of the axle to turn independently of each other.

The ends of the flat key $b$ also pass through slots in an elongated sleeve or cylinder, I, surrounding the inner end of the hollow axle D, next to the wheel A. This sleeve I may be disconnected from the wheel A, or it may be formed with it, in the same manner as the sleeve H is formed with the wheel B; or it may be formed with the axle D, or welded to it. In other words, it should form a part of either the wheel or the axle, the object being to strengthen this part of the axle, where the greatest strain is.

The end of the hollow axle D is also provided with circumferential recesses $a'\,a'$ and flat keys $b'$, passed through the sleeve H, and lying in one or more of said recesses on one side. This latter device may be used independently of the key $b$ and recesses $a$, or at the same time with it, as desired.

It will readily be seen that, though connected together by the divided axle D D', the wheels A and B can and do turn independently of each other, thus reducing the friction in going around curves; and, furthermore, by means of either or both of the locking devices described, all lateral motion is prevented, and yet the wheels can be easily changed from narrow gage to broad gage, and vice versa. Suitable holes $d$ are provided for lubricating the axle, as shown.

Having thus fully described my invention, I claim as new and desire to secure by Letters Patent—

1. In combination with the solid axle D', projecting from the wheel B, and the hollow axle D, projecting from the wheel A, the re-enforcing sleeve I, the annular recesses $a\,a$, formed in the axle D', and one or more flat keys, $b$, passing through the sleeve I and axle D, and filling one or more of the recesses $a$ on one side, substantially as and for the purposes herein set forth.

2. In combination with the hollow axle D, projecting from the wheel A, and the solid axle D' and sleeve H, projecting from the wheel B, the annular recesses $a'$ $a'$, formed around the outside of the hollow axle D, and one or more flat keys, $b'$, passing through the sleeve H, and filling one or more of the recesses $a'$ on one side, substantially as and for the purposes herein set forth.

In testimony that I claim the foregoing as my own I have hereto affixed my signature in presence of two witnesses.

NATHANIEL JONES.

Witnesses:
WM. B. UPPERMAN,
FRANK GALT.